(12) United States Patent
Chunduri et al.

(10) Patent No.: US 10,805,082 B2
(45) Date of Patent: Oct. 13, 2020

(54) ID-BASED DATA PLANE SECURITY FOR IDENTITY-ORIENTED NETWORKS

(71) Applicant: Futurewei Technologies, Inc., Plano, TX (US)

(72) Inventors: Uma S. Chunduri, Fremont, CA (US); Alexander Clemm, Los Gatos, CA (US); Padmadevi Pillay-Esnault, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 381 days.

(21) Appl. No.: 15/640,156

(22) Filed: Jun. 30, 2017

(65) Prior Publication Data

US 2019/0007211 A1 Jan. 3, 2019

(51) Int. Cl.
*H04L 29/06* (2006.01)
*H04L 9/32* (2006.01)
(Continued)

(52) U.S. Cl.
CPC .............. *H04L 9/32* (2013.01); *H04L 9/0825* (2013.01); *H04L 9/30* (2013.01); *H04L 63/0428* (2013.01);
(Continued)

(58) Field of Classification Search
CPC . H04L 9/32; H04L 9/0825; H04L 9/30; H04L 63/0428; H04L 63/12; H04L 9/3263
(Continued)

(56) References Cited

U.S. PATENT DOCUMENTS 6,292,836 B1 * 9/2001 Teraoka ................. H04L 69/161
709/236
7,062,500 B1 * 6/2006 Hall ......................... G06F 21/10
(Continued)

FOREIGN PATENT DOCUMENTS

| CN | 101355422 A | 1/2009 |
| EP | 1523149 A2 | 4/2005 |

OTHER PUBLICATIONS

Rabin Patra; Hierarchical Identity Based Cryptography for End-to-End Security in DTNs; IEEE:2008; p. 223-230 (Year: 2008).*
(Continued)

*Primary Examiner* — Monjur Rahim
(74) *Attorney, Agent, or Firm* — Schwegman Lundberg & Woessner, P.A.

(57) ABSTRACT

A computer-implemented method of transmitting encrypted data comprises accessing, by one or more processors of an origination endpoint, first data to be transmitted to a destination having a corresponding identifier; generating, by the one or more processors, an identifier security header; generating, by the one or more processors, second data from the first data and the identifier security header; encrypting, by the one or more processors, the second data; generating, by the one or more processors, authentication data based on the encrypted second data; generating, by the one or more processors, third data from the encrypted second data and the authentication data; generating, by the one or more processors, fourth data from the identifier corresponding to the destination and the third data; and sending, by the one or more processors, the fourth data to the destination.

20 Claims, 9 Drawing Sheets

(51) Int. Cl.
*H04L 9/08* (2006.01)
*H04L 9/30* (2006.01)

(52) U.S. Cl.
CPC ............... *H04L 63/12* (2013.01); *H04L 9/08* (2013.01); *H04L 9/3263* (2013.01)

(58) Field of Classification Search
USPC ........................................................ 713/156
See application file for complete search history.

(56) References Cited

U.S. PATENT DOCUMENTS

| | | | | |
|---|---|---|---|---|
| 8,533,851 | B2* | 9/2013 | Ginter ..................... | G06F 21/10 |
| | | | | 713/193 |
| 8,918,839 | B2* | 12/2014 | Vainstein .............. | H04L 63/102 |
| | | | | 713/168 |
| 9,807,205 | B2* | 10/2017 | Mosko ..................... | H04L 45/74 |
| 10,021,222 | B2* | 7/2018 | Mosko ..................... | H04L 69/04 |
| 2002/0097724 | A1 | 7/2002 | Halme et al. | |
| 2005/0256975 | A1 | 11/2005 | Kaniz et al. | |
| 2005/0257051 | A1* | 11/2005 | Richard ................ | H04L 9/3247 |
| | | | | 713/165 |
| 2006/0262783 | A1 | 11/2006 | Nedeltchev | |
| 2011/0119487 | A1 | 5/2011 | Alexander et al. | |
| 2011/0238985 | A1* | 9/2011 | Sovio ................. | H04N 21/2347 |
| | | | | 713/168 |
| 2012/0054765 | A1* | 3/2012 | Lee ....................... | G06F 9/5027 |
| | | | | 718/104 |
| 2014/0208104 | A1* | 7/2014 | Yoon ..................... | H04L 9/3073 |
| | | | | 713/168 |

OTHER PUBLICATIONS

"International Application No. PCT/CN2018/090193, International Search Report dated Sep. 7, 2018", (Sep. 7, 2018), 9 pgs.
Kaufman, C., et al., "Internet Key Exchange Protocol Version 2 (IKEv2)", RFC 7296, Internet Engineering Task Force (IETF), (Oct. 2014), 142 pgs.
Kent, S., "IP Authentication Header", RFC 4302, Network Working Group, (Dec. 2005), 34 pgs.
Kent, S., et al., "IP Encapsulating Security Payload (ESP)", RFC 4303, Network Working Group, (Dec. 2005), 44 pgs.
Kent, S., et al., "Security Architecture for the Internet Protocol", RFC 4301, Network Working Group, (Dec. 2005), 101 pgs.
Pillay-Esnault, P., et al., "Problem Statement for Identity Enabled Networks", Network Working Group, (Jul. 3, 2017), 12 pgs.
Pillay-Esnault, P., et al., "Requirements for Generic Resilient Identity Services in Identity Enabled Networks", Network Working Group, (Mar. 13, 2017), 15 pgs.
Pillay-Esnault, P., et al., "Use Cases for Identity Enabled Networks", Network Working Group, (Jul. 3, 2017), 17 pgs.
"European Application No. 18823946.1, Extended European Search Report dated Apr. 20, 2020", (Apr. 20, 2020), 7 pgs.
"Chinese Application No. 201880041419.8, Chinese Search dated Aug. 6, 2020", (Aug. 6, 2020), 2 pgs.
"Chinese Application No. 201880041419.8, First Office Action dated Aug. 13, 2020", (Aug. 13, 2020), 13 pgs.

* cited by examiner

ID-BASED DATA PLANE SECURITY FOR IDENTITY-ORIENTED NETWORKS

TECHNICAL FIELD

The present disclosure is related to identity-oriented networks (IONs) and, in one particular embodiment, to identity-based (ID-based) data plane security for IONs.

BACKGROUND

In Internet Protocol (IP) networks, data packets are addressed to an IP address of a destination endpoint. The IP address not only identifies the destination endpoint but is a locator used for routing the data packets to the destination endpoint. As a result, if the destination endpoint changes IP addresses (e.g., due to disconnecting from the network and reconnecting via a different access point (AP)), packets addressed to the original IP address will not reach the destination.

In IONs, data packets are addressed to an identifier of a destination endpoint. Identifiers are long-lived and tied to the endpoint identity rather than the location of the endpoint. Generic Resilient Identity Services (GRIDS) may be used to enable mapping of locators to identifiers (e.g., by a mapping server or GRIDS-MS). When an endpoint changes locations, it informs the GRIDS-MS. Thus, the GRIDS-MS may send the updated location to any other endpoints that wish to continue communicating with the endpoint that moved.

IP traffic may be protected using IPSec, a security protocol for IP defined by Internet Engineering Task Force (IETF) Requests for Comments (RFCs) 4301, 4302, and 4303. IPSec supports authentication headers (AH) that authenticate the origin of data packets and encapsulating security payloads (ESP) that provide confidentiality (e.g., encryption) and authentication.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

According to one aspect of the present disclosure, a computer-implemented method of transmitting encrypted data is provided that comprises: accessing, by one or more processors of an origination endpoint, first data to be transmitted to a destination having a corresponding identifier; generating, by the one or more processors, an identifier security header; generating, by the one or more processors, second data from the first data and the identifier security header; encrypting, by the one or more processors, the second data; generating, by the one or more processors, authentication data based on the encrypted second data; generating, by the one or more processors, third data from the encrypted second data and the authentication data; generating, by the one or more processors, fourth data from the identifier corresponding to the destination and the third data; and sending, by the one or more processors, the fourth data to the destination.

Optionally, in any of the preceding aspects, the method further comprises: generating an Internet protocol (IP) header that is addressed to a location of the destination; and generating fifth data from the fourth data and the IP header; and wherein the sending of the fourth data to the destination is part of sending the fifth data to the destination.

Optionally, in any of the preceding aspects, the generating of the identifier security header includes generating an initialization vector.

Optionally, in any of the preceding aspects, the generating of the second data from the first data and the identifier security header prepends the identifier security header to the first data.

Optionally, in any of the preceding aspects, the method further comprises: generating fifth data from the fourth data and an identifier security protocol version number; and wherein the sending of the fourth data to the destination is part of sending the fifth data to the destination.

Optionally, in any of the preceding aspects, the method further comprises: registering, with a mapping server, one or more encryption methods supported by the origination endpoint.

Optionally, in any of the preceding aspects, the method further comprises receiving, from the mapping server, an identifier of an encryption method to use for communication with the destination, the received identifier corresponding to one of the registered encryption methods.

Optionally, in any of the preceding aspects, the encrypting of the third data comprises encrypting the third data using the identified encryption method.

According to one aspect of the present disclosure, an origination endpoint comprises: a memory storage comprising instructions; and one or more processors in communication with the memory storage, wherein the one or more processors execute the instructions to perform: accessing first data to be transmitted to a destination having a corresponding identifier; generating an identifier security header; generating second data from the first data and the identifier security header; encrypting the second data; generating authentication data based on the encrypted second data; generating third data from the encrypted second data and the authentication data; generating fourth data from the identifier corresponding to the destination and the third data; and sending the fourth data to the destination.

Optionally, in any of the preceding aspects, the one or more processors further perform: generating an Internet protocol (IP) header that is addressed to a location of the destination; and generating fifth data from the fourth data and the IP header; and wherein the sending of the fourth data to the destination is part of sending the fifth data to the destination.

Optionally, in any of the preceding aspects, the generating of the identifier security header includes generating an initialization vector.

Optionally, in any of the preceding aspects, the generating of the second data from the first data and the identifier security header prepends the identifier security header to the first data.

Optionally, in any of the preceding aspects, the one or more processors further perform: generating fifth data from the fourth data and an identifier security protocol version number; and wherein the sending of the fourth data to the destination is part of sending the fifth data to the destination.

Optionally, in any of the preceding aspects, the one or more processors further perform: registering, with a mapping server, one or more encryption methods supported by the origination endpoint.

Optionally, in any of the preceding aspects, the one or more processors further perform: receiving, from the mapping server, an identifier of an encryption method to use for communication with the destination, the received identifier corresponding to one of the registered encryption methods.

Optionally, in any of the preceding aspects, the encrypting of the second data comprises encrypting the second data using the identified encryption method.

According to one aspect of the present disclosure, a non-transitory computer-readable medium is provided that stores computer instructions for transmitting encrypted data, that when executed by one or more processors, cause the one or more processors to perform steps of: accessing first data to be transmitted to a destination having a corresponding identifier; generating an identifier security header; generating second data from the first data and the identifier security header; encrypting the second data; generating authentication data based on the encrypted second data; generating third data from the encrypted second data and the authentication data; generating fourth data from the identifier corresponding to the destination and the third data; and sending the fourth data to the destination.

Optionally, in any of the preceding aspects, the one or more processors further perform: generating an IP header that is addressed to a location of the destination; and generating fifth data from the fourth data and the IP header; and wherein the sending of the fourth data to the destination is part of sending the fifth data to the destination.

Optionally, in any of the preceding aspects, the generating of the identifier security header includes generating an initialization vector.

Optionally, in any of the preceding aspects, the generating of the second data from the first data and the identifier security header prepends the identifier security header to the first data.

Any one of the foregoing examples may be combined with any one or more of the other foregoing examples to create a new embodiment within the scope of the present disclosure.

DETAILED DESCRIPTION

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software, in one embodiment. The software may consist of computer-executable instructions stored on computer-readable media or a computer-readable storage device such as one or more non-transitory memories or other types of hardware-based storage devices, either local or networked. The software may be executed on a digital signal processor, application-specific integrated circuit (ASIC), programmable data plane chip, field-programmable gate array (FPGA), microprocessor, or other type of processor operating on a computer system, such as a switch, server, or other computer system, turning such a computer system into a specifically programmed machine.

In some example embodiments, two endpoints in an ION communicate securely while also taking advantage of identity-enabled networking services of the ION. In prior art implementations, the use of IPSec to provide security encrypts ID information. This encryption prevents identity-enabled networking services of an ION from functioning. To enable the endpoints to communicate securely without preventing the identity-enabled networking services from functioning, at least a portion of the ID layer information is not encrypted.

Figure 1:
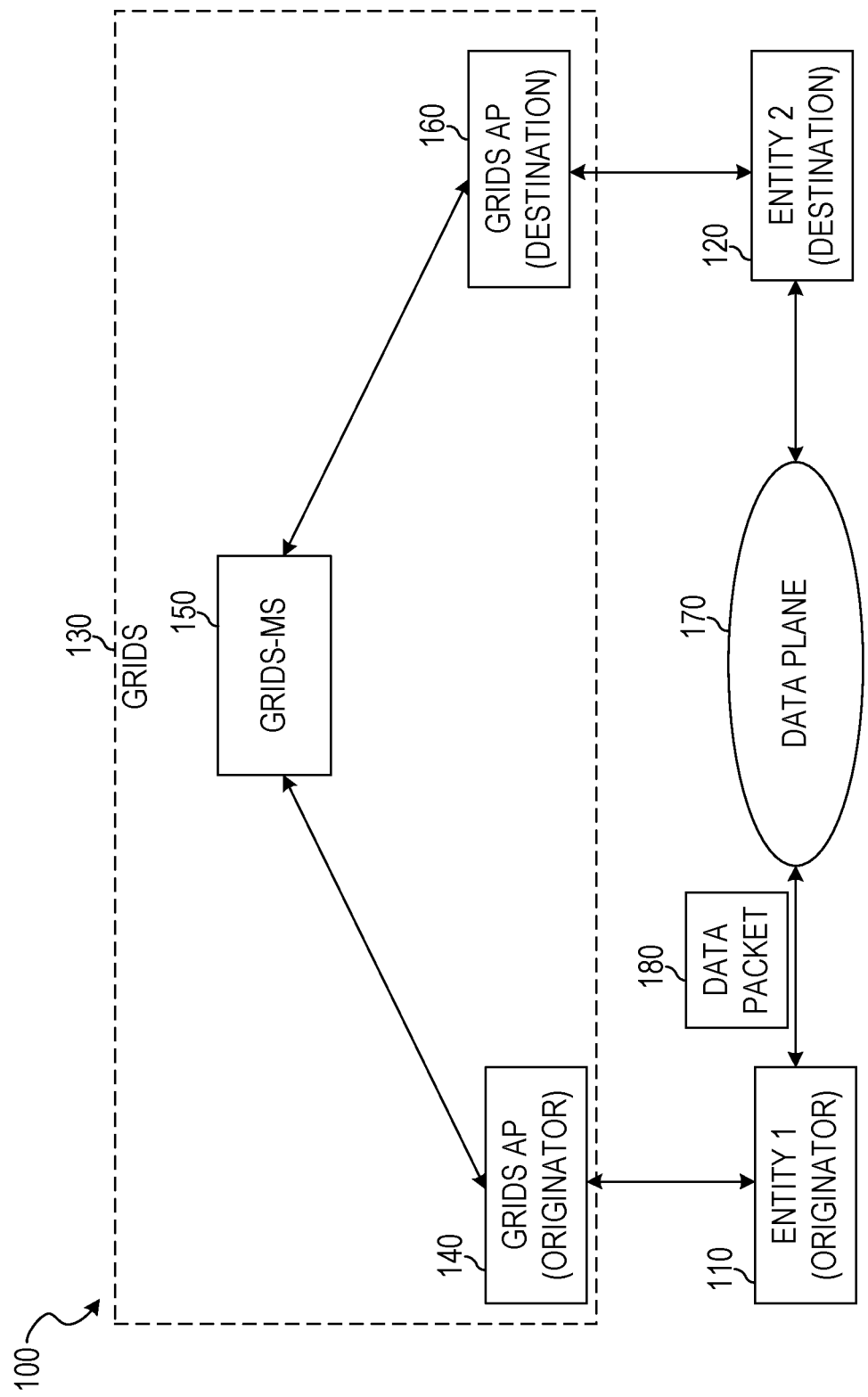
FIG. 1 is an illustration of an example network organization for implementing ID-based data plane security, according to some example embodiments.

FIG. 1 is an illustration of an example network organization 100 for implementing ID-based data plane security, according to some example embodiments. The example network organization 100 includes a first endpoint 110, a second endpoint 120, a data plane 170, a data packet 180, and a GRIDS network 130. The GRIDS network 130 comprises a GRIDS AP 140, a GRIDS AP 160, and a GRIDS-MS 150.

The endpoint 110 may register with the originating GRIDS AP 140, allowing the endpoint 110 to communicate via the GRIDS network 130. Similarly, the endpoint 120 may register with the destination GRIDS AP 160. To communicate with the endpoint 120, the endpoint 110 may request a locator for an identifier of the endpoint 120 from the originating GRIDS AP 140. In some example embodiments, identifiers are 128-bit values, IPv6 locators, or other values. The GRIDS AP 140 forwards the request to the GRIDS-MS 150, which may include a database mapping identifiers to locators. The GRIDS-MS 150 may send the locator for the endpoint 120 to the originating GRIDS AP 140. The originating GRIDS AP 140 sends the received data to the endpoint 110, which then communicates with the endpoint 120 via the data plane 170.

In some example embodiments, the data plane 170 is implemented by one or more routers of an IP network. For example, the endpoint 110 may send, to a first router, a data packet 180 addressed to the IP address of the endpoint 120 (e.g., an IP address for the endpoint 120 retrieved from the GRIDS-MS 150 in response to a request by the endpoint 110, wherein the request included an identifier of the endpoint 120). The first router looks up the IP address of the endpoint 120 in a routing table to retrieve an IP address of a second router for the next hop in the path between the two endpoints. The first router forwards the data packet 180 to the second router. The process is repeated for the remaining hops by additional intermediate routers until the data packet 180 reaches a final router connected to the endpoint 120. The final router forwards the data packet 180 to the endpoint 120, which then receives and processes the data packet 180. The same process occurs when the endpoint 120 sends a response.

Figure 2:
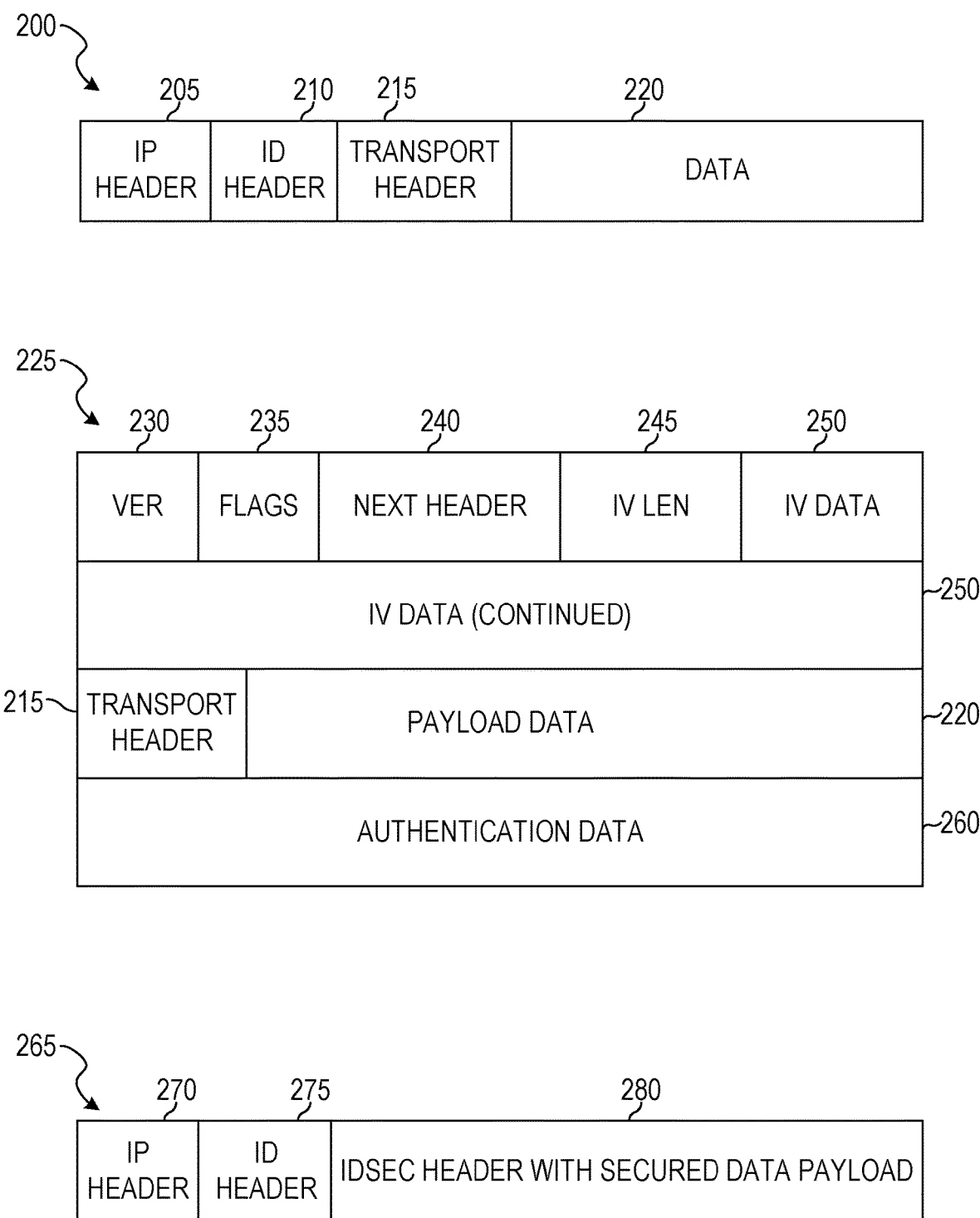
FIG. 2 is a block diagram illustration of data structures suitable for implementing ID-based data plane security, according to some example embodiments.

FIG. 2 is a block diagram illustration of data structures suitable for implementing ID-based data plane security, according to some example embodiments. FIG. 2 shows data structure 200 comprising an IP header 205, an ID header 210, a transport header 215, and data 220; data structure 225 comprising a version 230, flags 235, a next header type 240, an initialization vector (IV) length 245, IV data 250, payload data 220 and authentication data 260; and data structure 265 comprising an IP header 270, an ID header 275, and an IDSec header with secured data payload 280. The elements of the data structures 200, 225, and 265 may also be referred to as data fields 205-220, 230-260, and 270-280. In some example embodiments, the data packet 180 is implemented using the data structure 200, the data structure 225, or the data structure 265.

The data structure 200 may be used as an IP version 4 (IPv4) or IP version 6 (IPv6) data packet. In both IPv4 and IPv6, the IP header 205 includes a source IP address and a destination IP address. The ID header 210 includes an identifier of the destination entity of the data structure 200 (referred to as a destination ID) and an identifier of the source entity of the data structure 200 (referred to as a source ID). In various example embodiments, additional fields are also included in the ID header 210. The transport header 215 (e.g., a transmission control protocol (TCP) header or a user datagram protocol (UDP) header) includes a source port number and a destination port number. Thus, a data packet using the data structure 200 indicates both the source location (IP address) and application (port) as well as the destination location (IP address) and application (port). The data 200 may be provided to the destination application by the operating system of the destination device after the data packet is routed to the destination device based on the IP address.

The data structure 225 includes an example of an IDSec header and trailer encapsulating the transport header 215 and the data 220. The version 230 may be a 4-bit identifier of the version of the IDSec header (e.g., 0x01). The flags 235 may be a 4-bit field of option flags (e.g., one bit to indicate if the payload data 220 is encrypted, one bit to indicate if the next header follows the IV length 245 or any suitable combination thereof). The next header type 240 may indicate the type of the following header (e.g., one of the header types recognized by the Internet assigned numbers authority (IANA)). The IV length 245 may indicate the length of the IV data 250 in bytes. In some example embodiments, the IV length 245 is not present or is valid only if the flags 235 indicate both that the payload data 220 is encrypted and that the next header follows the IV length 245. The IV data 250 may be a random sequence, a pseudorandom sequence, or a non-repeating sequence used during the encryption process. The payload data 220 is the data being sent from the source to the destination, encrypted or unencrypted (e.g., as indicated by an encryption flag in the flags 235).

The authentication data 260 may be used to authenticate that the indicated source of the data structure 225 is correct. For example, a digest for the payload data 220 and the immutable fields of the ID header may be determined by the receiving system. The immutable fields are the fields that do not change while the data packet is in transit through the network. For example, the source identifier and the destination identifier are immutable fields. Including mutable fields when generating the digest would prevent the receiving entity from authenticating the data packet, since the value of the mutable fields on receipt would be different from their value when the data packet was sent. The computed digest is compared to the authentication data 260 and the packet is considered authentic only if the values match. The authentication data 260 is generated and checked using keys that have been exchanged securely between the two parties to the communication. For example, the Internet Key Exchange version 2 (IKEv2) protocol, defined in IETF RFC 5996, may be used for key exchange. In the example embodiment of the data structure 225, the authentication data 260 is placed after the payload data 220, and thus may be considered to be an IDSec trailer.

The data structure 265 may be used when transmitting secure data packets in an ION using IPv4 or IPv6. The IP header 270 indicates the destination IP address to which the data packet should be routed. The ID header 275 indicates an identifier of the entity to which the data packet is addressed and an identifier of the entity that sent the data packet. The IDSec header with secured data payload 280 may be the data structure 225, optionally including encrypted data comprising the transport header 215 and payload data 220. By use of the data structure 265, a data packet may be routed to the correct location (as indicated by the IP address in the IP header 270) and the correct identity (as indicated by the ID header 275). The receiving entity may then process the data structure 225 to authenticate the packet as being from the indicated source entity and, optionally, decrypt the transport header 215 and payload data 220.

Figure 3:
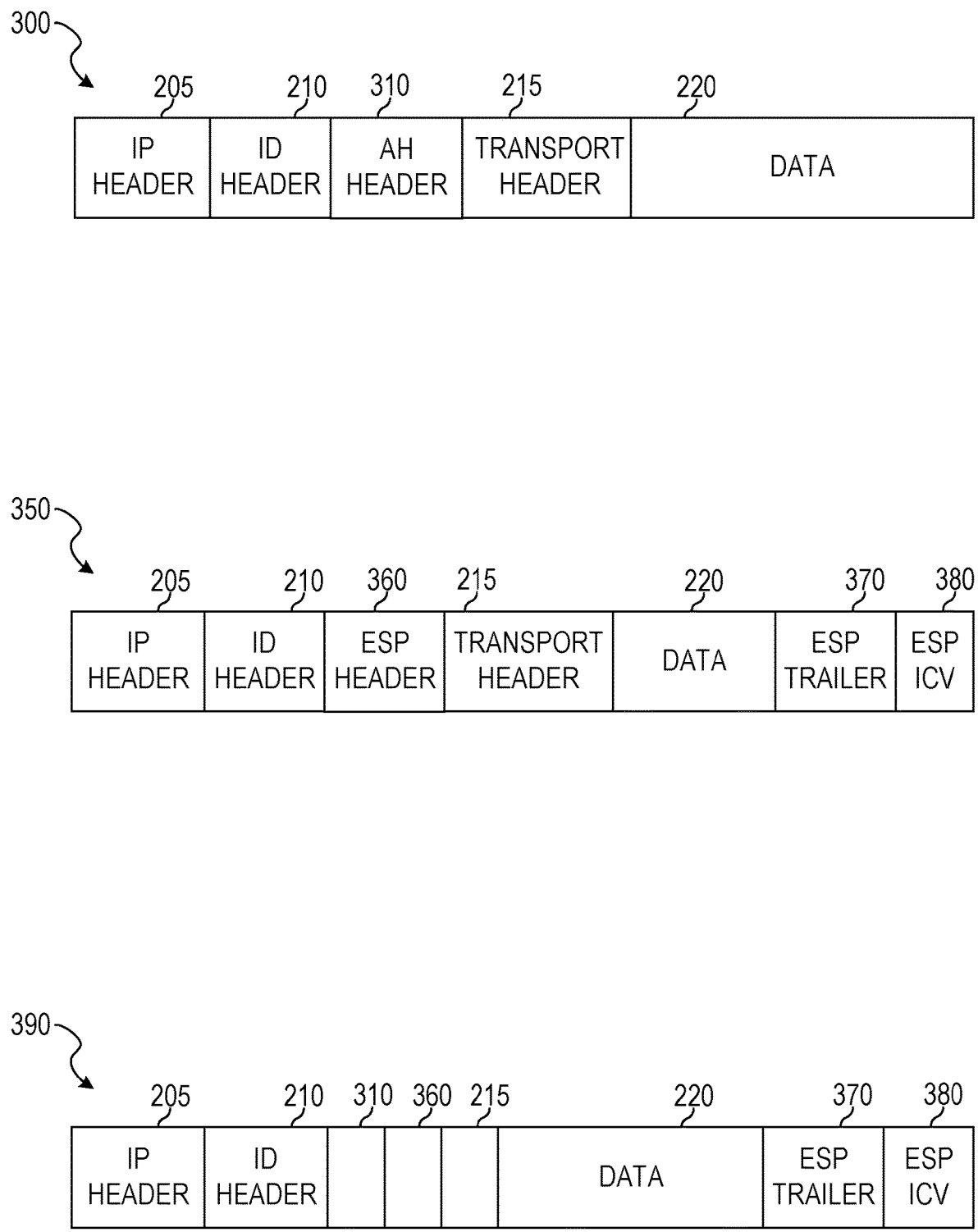
FIG. 3 is a block diagram illustration of data structures suitable for implementing ID-based data plane security, according to some example embodiments.

FIG. 3 is a block diagram illustration of data structures suitable for implementing ID-based data plane security with traditional IPSec protocols, according to some example embodiments. FIG. 3 shows a data structure 300, which is a modified version of the data structure 200, including IP header 205, ID header 210, AH 310, transport header 215, and data 220. FIG. 3 also shows a data structure 350, another modified version of the data structure 200, including IP header 205, ID header 210, ESP header 360, transport header 215, data 220, ESP trailer 370, and ESP integrity check value 380. In some example embodiments, the data structures 300 and 350 are combined, yielding the data structure 390 that includes the data fields 205-220, the AH 310, and the data fields 360-380. In some example embodiments, the data packet 180 is implemented using the data structure 300, the data structure 350, or the data structure 390.

The AH 310 provides authentication of an IP data packet using the data structure 300. Authentication headers work with IP, using IP protocol number 51. An authentication header may include an 8-bit next header field indicating the protocol of the header, an 8-bit payload length field, a 32-bit security parameters index, a 32-bit sequence number, and a variable-length integrity check value. The integrity check value is set by the creator of the packet using a hash function so that any changes to the packet will be detected when the receiver of the packet recalculates the hash and compares the recalculated value with the received value. The AH 310 may be implemented following the instructions of IETF RFC 4302, incorporated herein by reference in its entirety.

The data fields 360-380 provide authentication of an IP data packet using the data structure 300. The ESP header 360 may include a 32-bit security parameters index and a 32-bit sequence number. The ESP trailer 370 may include an 8-bit pad length, an 8-bit next header, and 0-255 padding bytes. The ESP integrity check value 380 may be of variable length. As in the AH 310, the integrity check value is set by the creator of the packet using a hash function so that any changes to the packet will be detected when the receiver of the packet recalculates the hash and compares the recalculated value with the received value. The ESP fields 360-380 may be implemented following the instructions of IETF RFC 4303, incorporated herein by reference in its entirety.

In some example embodiments, introduction of an ID header (e.g., the ID header 210) is supported by modification of a security policy database (SPD), security association database (SAD), and a peer authorization database (PAD) described in IETF RFC 4301, incorporated herein by reference in its entirety.

SPD selectors may include a remote ID field instead of a remote IP address field. The remote ID field may include a range of IDs (e.g., IDs 1000-5000). The destination ID field of an outgoing packet may be used as the selector.

SPD selectors may include a local ID field instead of a local IP address field. The local ID field may include a range of IDs (e.g., IDs xx000-yy000). SPD selectors may include a local ID field instead of a local IP address field. The source ID field of an outgoing packet may be used as the selector.

The next layer protocol field of the SPD selectors is, in IETF 4301, obtained from the IPv4 protocol field or the IPv6 next header field. Using ID headers, the next layer protocol field may be obtained from the next header field 240, a component of the ID header 210.

In IETF 4301, the populate from packet (PFP) flags of SPD entries are, at least in part, derived from the local IP address, remote IP address, and next layer protocol fields of an IP packet. Using ID headers, the PFP flags may be derived from the source ID, destination ID, and next header fields of the ID header 210. Similarly, selector sets may be modified to use source ID, destination ID, and next header fields instead of local IP address, remote IP address, and next layer protocol fields.

The PAD links the SPD and a security association management protocol such as the Internet key exchange (IKEv2). According to IETF RFC 4301 Section 4.4.3.1, six types of identifiers are supported, including IPv4 address (or range of addresses) and IPv6 address (or range of addresses). When ID headers are used, these two types of identifiers may be replaced with an ID or range of IDs, matching the changes to the SPD discussed above from IP addresses to IDs.

For IP headers, SAD entries include a tunnel header IP source address and a tunnel header IP destination address. For ID headers, these fields may be changed to a tunnel header source ID and a tunnel header destination ID, derived from the ID header 210.

Figure 4:
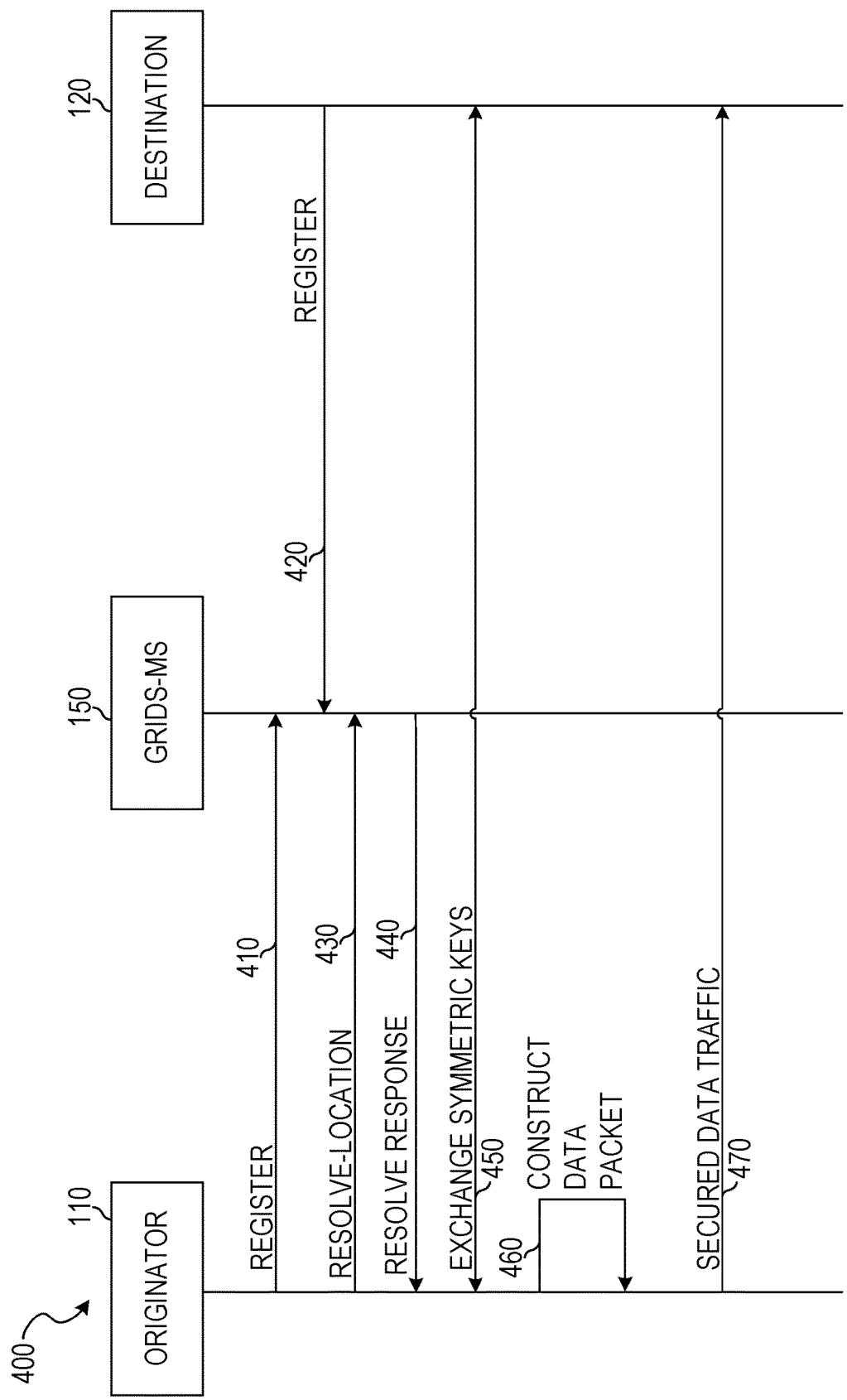
FIG. 4 is an illustration of an example communication flow within the example network organization for implementing ID-based data plane security, according to some example embodiments.

FIG. 4 is an illustration of an example communication flow 400 within the example network organization 100 for implementing ID-based data plane security, according to some example embodiments. The communication flow 400 includes communications 410, 420, 430, 440, 450, and 470 as well as operation 460.

In communication 410, the originator endpoint 110 registers with the GRIDS-MS 150. The registration indicates the location (e.g., IP address) of the originator endpoint 110 and the identity of the originator endpoint 110. In some example embodiments, the registration also indicates one or more authentication methods or encryption methods supported by the originator endpoint 110. For example, a set of one-bit flags may be used, with each bit set to 1 if a corresponding authentication method or encryption method is supported or to 0 if the corresponding authentication method or encryption method is not supported. Example encryption methods include data encryption standard (DES) and advanced encryption standard (AES), among others. Example authentication methods include secure hash algorithm (SHA)-128, SHA-256, and AES, among others.

In communication 420, the destination endpoint 120 registers with the GRIDS-MS 150. The registration indicates the location (e.g., IP address) of the destination endpoint 120 and the identity of the destination endpoint 120. In some example embodiments, the registration indicates one or more encryption methods supported by the destination endpoint 120.

In communication 430, the originator endpoint 110 requests resolution of a location for the identity of the destination endpoint 120 from the GRIDS-MS 150. The GRIDS-MS 150 responds to the communication 430 with communication 440, providing the location for the destination endpoint 120 to the originator endpoint 110. In some example embodiments, the communication 440 includes an indication of an authentication or encryption method to be used for communication between the endpoint 110 and the endpoint 120. For example, the GRIDS-MS 150 may compare flags provided during registration by the endpoint 110 with flags provided during registration by the endpoint 120 to identify one or more authentication or encryption methods supported by both endpoints. The GRIDS-MS 150 may select one of the supported methods (e.g., through a prioritization scheme) or provide an indication of all mutually supported methods in the communication 440.

In communication 450, the originator endpoint 110 and the destination endpoint 120 exchange symmetric keys. The key exchange may be mutually agreed upon offline or exchanged through a secure communications channel or a secure key exchange protocol such as IKEv2 may be used.

In operation 460, the originator endpoint 110 constructs a secured data packet (e.g., using the data structure 225) and, in communication 470, transmits the secured data to the destination endpoint 120. The secured data packet includes authentication information. The data may be encrypted using an encryption method identified by the GRIDS-MS (e.g., identified in the communication 440).

Figure 5:
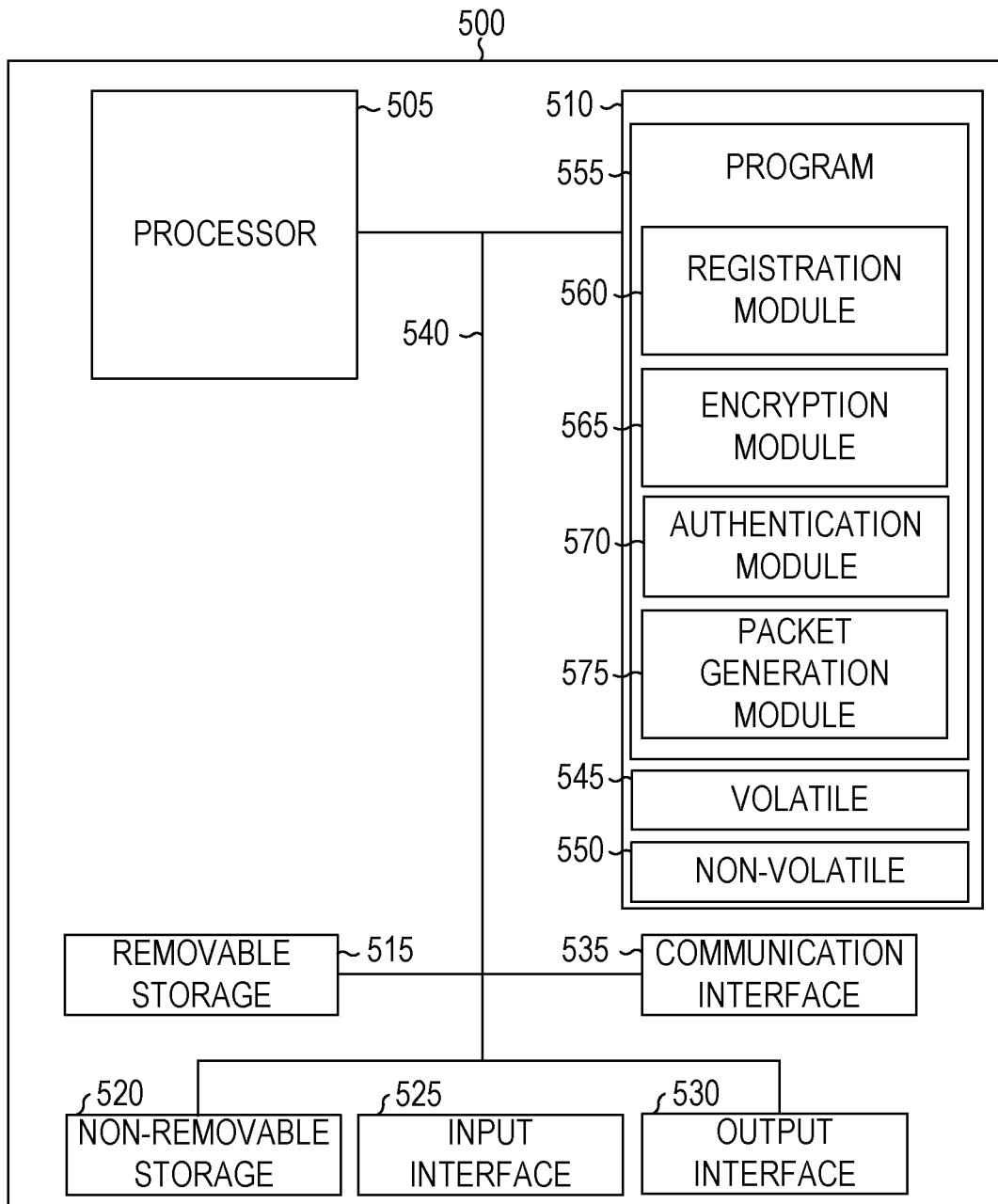
FIG. 5 is a block diagram illustrating circuitry for clients and servers that implement algorithms and perform methods, according to some example embodiments.

FIG. 5 is a block diagram illustrating circuitry for implementing algorithms and performing methods, according to example embodiments. All components need not be used in various embodiments. For example, clients, servers, autonomous systems, and cloud-based network resources may each use a different set of components, or, in the case of servers for example, larger storage devices.

One example computing device in the form of a computer 500 (also referred to as computing device 500 and computer system 500) may include a processor 505, memory storage 510, removable storage 515, and non-removable storage 520, all connected by a bus 540. Although the example computing device is illustrated and described as the computer 500, the computing device may be in different forms in different embodiments. For example, the computing device may instead be a smartphone, a tablet, a smartwatch, or another computing device including elements the same as or similar to those illustrated and described with regard to FIG. 5. Devices such as smartphones, tablets, and smartwatches are generally collectively referred to as "mobile devices" or "user equipment." Further, although the various data storage elements are illustrated as part of the computer 500, the storage may also or alternatively include cloud-based storage accessible via a network, such as the Internet, or server-based storage. The first endpoint 110, the second endpoint 120, the GRIDS AP 140, the GRIDS AP 160, and the GRIDS-MS 150 may each be implemented as a computer 500. Additionally, routers of the data plane 170 may be implemented as computers 500.

The memory storage 510 may include volatile memory 545 and non-volatile memory 550, and may store a program 555. The computer 500 may include, or have access to, a computing environment that includes a variety of computer-readable media, such as the volatile memory 545, the non-volatile memory 550, the removable storage 515, and the non-removable storage 520. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 500 may include or have access to a computing environment that includes an input interface 525, an output interface 530, and a communication interface 535. The output interface 530 may interface to or include a display device, such as a touchscreen, that also may serve as an input device. The input interface 525 may interface to or include one or more of a touchscreen, a touchpad, a mouse, a keyboard, a camera, one or more device-specific buttons, one or more sensors integrated within or coupled via wired or wireless data connections to the computer 500, and other input devices. The computer 500 may operate in a networked environment using the communication interface 535 to connect to one or more remote computers, such as database servers. The remote computer may include a personal computer (PC), server, router, network PC, peer device or other common network node, or the like. The communication interface 535 may connect to a local-area network (LAN), a wide-area network (WAN), a cellular network, a WiFi network, a Bluetooth network, or other networks.

Computer-readable instructions stored on a computer-readable medium (e.g., the program 555 stored in the memory storage 510) are executable by the processor 505 of the computer 500. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 555 is shown as including a registration module 560, an encryption module 565, an authentication module 570, and a packet generation module 575. Any one or more of the modules described herein may be implemented using hardware (e.g., a processor of a machine, an ASIC, an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The registration module 560 registers an endpoint with a mapping server, handles incoming registration requests (e.g., by storing registration data in a database), or both. The encryption module 565 encrypts data for secure transmission over a network, decrypts received data, or both. The authentication module 570 determines integrity check values for authentication for inclusion in data packets to be transmitted over a network, determines integrity check values of received data packets for comparison to the values included in the received data packets, or both.

The packet generation module 575 generates data packets for transmission over a network (e.g., via the communication interface 535). The packet generation module 575 may invoke the encryption module 565, the authentication module 570, or both.

Figure 6:
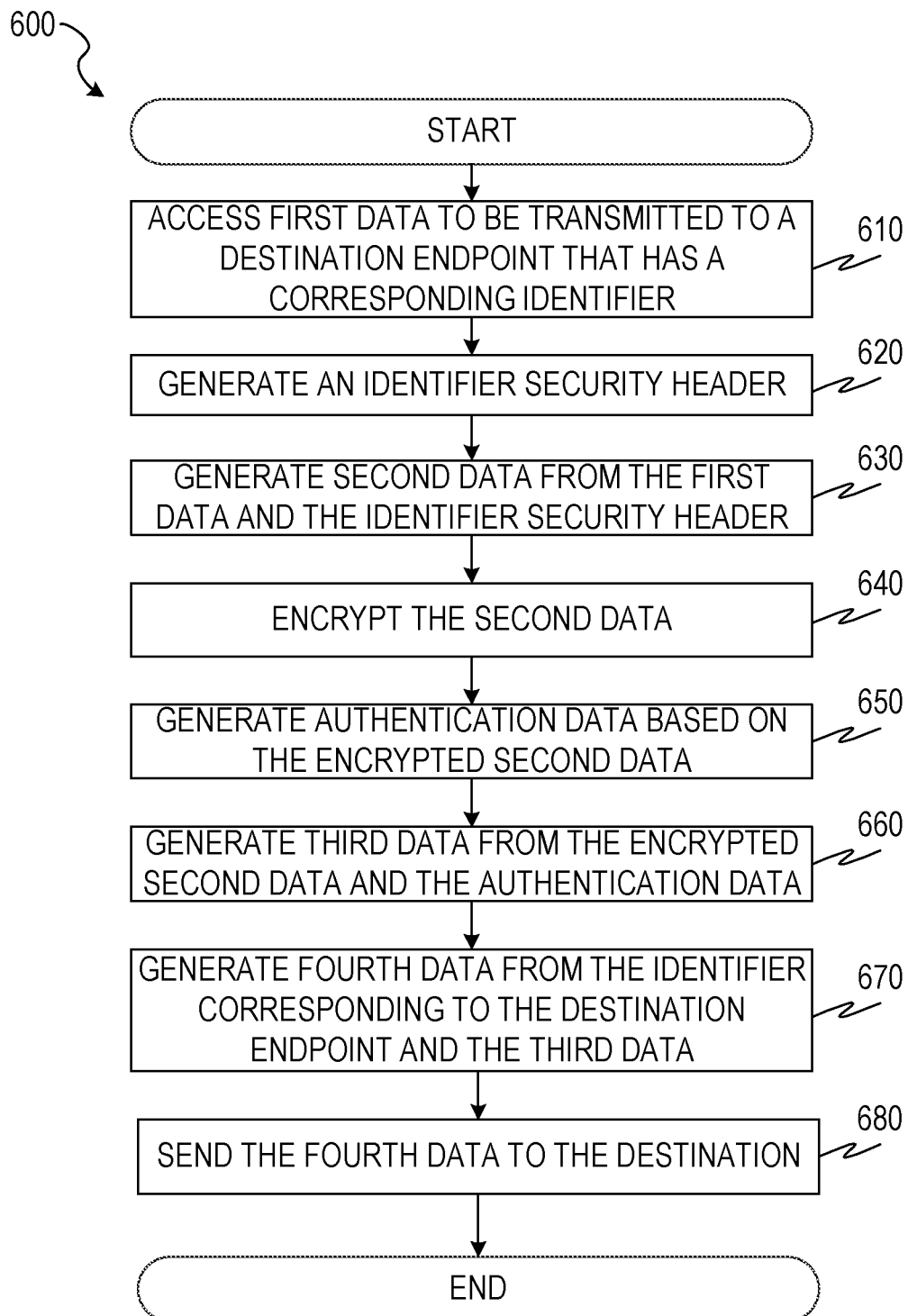
FIG. 6 is a flowchart illustration of a method of implementing ID-based data plane security in an ION, according to some example embodiments.

FIG. 6 is a flowchart illustration of a method of implementing ID-based data plane security in an ION, according to some example embodiments. The method 600 includes operations 610, 620, 630, 640, 650, 660, 670, and 680. By way of example and not limitation, the method 600 is described as being performed by elements of the endpoint 110, described above with respect to FIGS. 1 and 4, and the computer 500, described above with respect to FIG. 5.

In operation 610, the packet generation module 575 of the endpoint 110 accesses first data (e.g., data 220 of FIGS. 2-3) to be transmitted to a destination endpoint that has a corresponding identifier. For example, a game application running on the endpoint 110 may have data to send to another instance of the game running on the end point 120. The endpoint 120 may have registered with the GRIDS-MS 150 using the identifier of "SHAZAM." The packet generation module 575 may have determined the identifier of the destination endpoint through earlier communications. For example, a central matchmaking server with a predetermined identifier known by the game application may have been contacted and provided the identifier for the endpoint 120 to the endpoint 110 to allow the two endpoints to establish direct communications to the play the game.

In operation 620, the packet generation module 575 generates an IDSec header (e.g., using the elements 230-250 of the data structure 225). The IDSec header may indicate both a locator (e.g., an IP address) and the identifier (e.g., "SHAZAM") for the destination endpoint 120. In some example embodiments, generating the IDSec header includes generating an initialization vector. For example, the encryption module 570 may generate a random or pseudorandom sequence for use during encryption and decryption. The sequence is included in the IDSec header to allow the recipient to decrypt data encrypted using the sequence, but prevents an attacker from gaining any knowledge through intercepting multiple packets that contain similar data.

In operation 630, the packet generation module 575 generates second data from the first data and the IDSec header. For example, the IDSec header may be prepended to the data to be transmitted to generate the second data. In some example embodiments, the second data includes a transport header 215. In these example embodiments, the second data may comprise elements 230, 235, 240, 245, 250, 215, and 220 of FIG. 2.

In operation 640, the encryption module 565 encrypts the second data. For example, the encryption module 565 may use symmetric-key encryption, which is secure so long as only the source endpoint 110 and the destination endpoint 120 have access to the key used for encryption and decryption. The encryption module 565 may make use of the initialization vector generated in operation 620, if any. For example, a bitwise exclusive-or (XOR) may be applied between the initialization vector and a first block of the third data as part of the encryption process.

In operation 650, the authentication module 570 generates authentication data (e.g., authentication data 260) based on the encrypted second data. For example, a hashing algorithm may be used on the first data and the immutable portions of the IDSec header to generate authentication data.

In operation 660, the packet generation module 575 generates third data from the encrypted second data and the authentication data. For example, the authentication data may be appended to the encrypted second data. In some example embodiments, the third data is the IDSec header with secured data payload 280 of FIG. 2.

In operation 670, the packet generation module 575 generates fourth data from the identifier corresponding to the destination endpoint and the encrypted third data. For example, the identifier may be included in an ID header 275 prepended to the encrypted third data.

In operation 680, the packet generation module 575 sends the fourth data to the destination endpoint. For example, the fourth data may be a completed data packet using the data structure 265, sent to the destination endpoint 120 via the data plane 170.

In some example embodiments, the packet generation module 575 generates additional data for transmission. For example, the additional data may comprise an IP header 270 that is addressed to a location of the endpoint 120, an IPSec version number, or both. The packet generation module 575 may prepend the additional data to the fourth data to generate fifth data and send the fifth data (which includes the fourth data) in operation 680.

Figure 7:
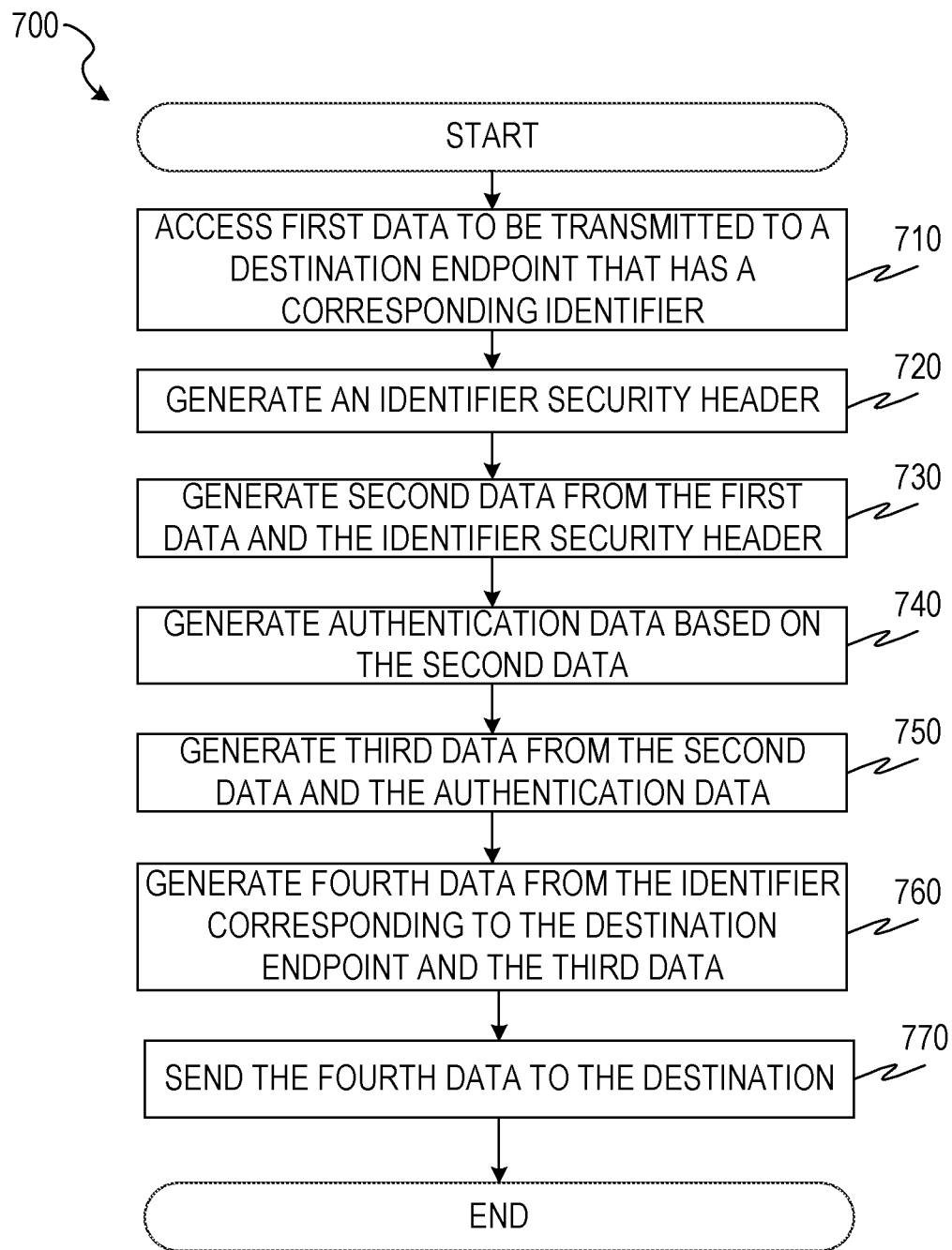
FIG. 7 is a flowchart illustration of a method of implementing ID-based data plane security in an ION, according to some example embodiments.

FIG. 7 is a flowchart illustration of a method 700 of implementing ID-based data plane security in an ION, according to some example embodiments. The method 700 includes operations 710, 720, 730, 740, 750, 760, and 770. By way of example and not limitation, the method 700 is described as being performed by elements of the endpoint 110, described above with respect to FIGS. 1 and 4, and the computer 500, described above with respect to FIG. 5. The method 700 is similar to the method 600, except that the data is not encrypted. The data is still secured however, by virtue of the authentication data generated in operation 740, as described below.

In operation 710, the packet generation module 575 of the endpoint 110 accesses first data to be transmitted to a destination endpoint that has a corresponding identifier. In operation 720, the packet generation module 575 generates an IDSec header (e.g., using the data structure 225). The IDSec header may indicate both a locator and the identifier for the destination endpoint 120.

In operation 730, the packet generation module 575 generates second data from the first data and the IDSec header. For example, the IDSec header may be prepended to the data to be transmitted to generate the second data.

In operation 740, the authentication module 570 generates authentication data based on the second data. For example, a hashing algorithm may be used on the first data and the immutable portions of the IDSec header to generate authentication data.

In operation 750, the packet generation module 575 generates third data from the second data and the authentication data. For example, the authentication data may be appended to the second data.

In operation 760, the packet generation module 575 generates fourth data from the identifier corresponding to the destination endpoint and the unencrypted third data. For example, the identifier may be prepended to the unencrypted third data.

In operation 770, the packet generation module 575 sends the fourth data to the destination endpoint. For example, the fourth data may be a completed data packet using the data structure 265, sent to the destination endpoint 120 via the data plane 170.

Figure 8:
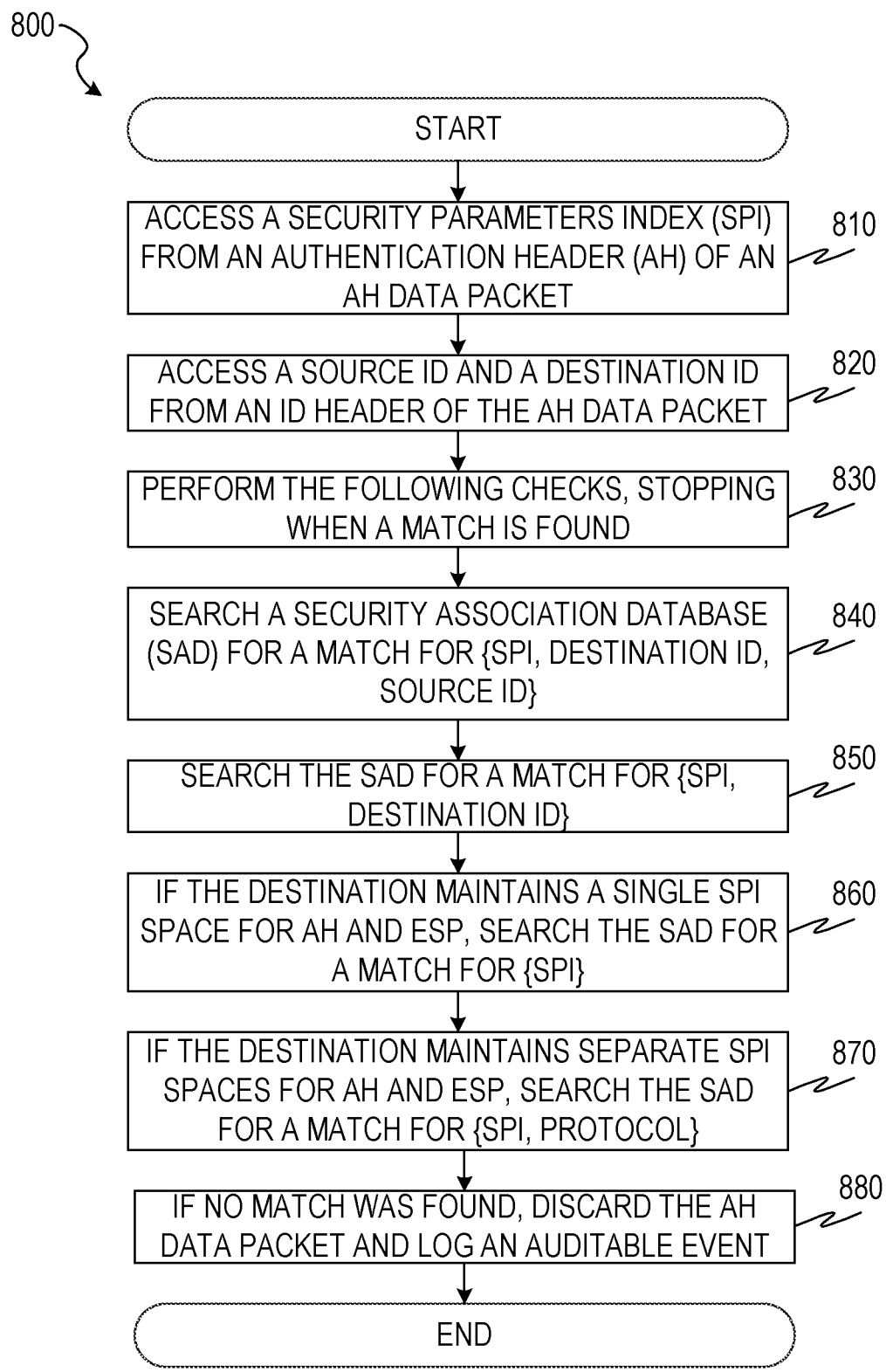
FIG. 8 is a flowchart illustration of a method of implementing ID-based data plane security in an ION, according to some example embodiments.

FIG. 8 is a flowchart illustration of a method 800 of implementing ID-based data plane security in an ION, according to some example embodiments. The method 800 includes operations 810, 820, 830, 840, 850, 860, 870, and 880. By way of example and not limitation, the method 800 is described as being performed by elements of the endpoint 120, described above with respect to FIGS. 1 and 4, and the computer 500, described above with respect to FIG. 5.

In operation 810, the authentication module 570 accesses a security parameters index (SPI) from an AH of an AH data packet. For example, the endpoint 120 may receive a data packet of the form of the data structure 300 or the data structure 390, each of which includes AH 310. The AH 310 may include a SPI. As described in IETF RFC 4302, the SPI may be a 32-bit value used by a receiver to identify the security association to which an incoming packet is bound.

In operation 820, the authentication module 570 accesses a source ID and a destination ID from an ID header of the AH data packet. For example, the ID header 210 is a component of both the data structure 300 and the data structure 390, and may include a source ID and a destination ID.

In operation 830, the authentication module 570 performs one or more of the checks of operations 840-870, stopping when a match is found.

In operation 840, the authentication module 570 searches a SAD for a match for {SPI, destination ID, source ID}. If an entry in the SAD has the same SPI, destination ID, and source ID as the received AH data packet, the matching entry identifies the security association to which the packet is bound.

In operation 850, the authentication module 570 searches a SAD for a match for {SPI, destination ID}. If an entry in the SAD has the same SPI and destination ID as the received AH data packet, the matching entry identifies the security association to which the packet is bound.

In operation 860, if the authentication module 570 maintains a single SPI space for both AH and ESP, the authentication module searches a SAD for a match for {SPI}. If an entry in the SAD has the same SPI as the received AH data packet, the matching entry identifies the security association to which the packet is bound.

In operation 870, if the authentication module 570 maintains separate SPI spaces for AH and ESP, the authentication module searches a SAD for a match for {SPI, protocol}, where the protocol is AH. If an entry in the SAD has the same SPI and protocol as the received AH data packet, the matching entry identifies the security association to which the packet is bound.

In operation 880, if no match was found in operations 840-870, the received AH data packet is discarded by the authentication module 570 and an auditable event is logged. An administrator may be notified of the auditable event. For example, the authentication module 570 may cause an email to be sent to an administrator email address. The notification may include a date/time of the event, the source ID, the destination ID, the protocol, or any suitable combination thereof.

Figure 9:
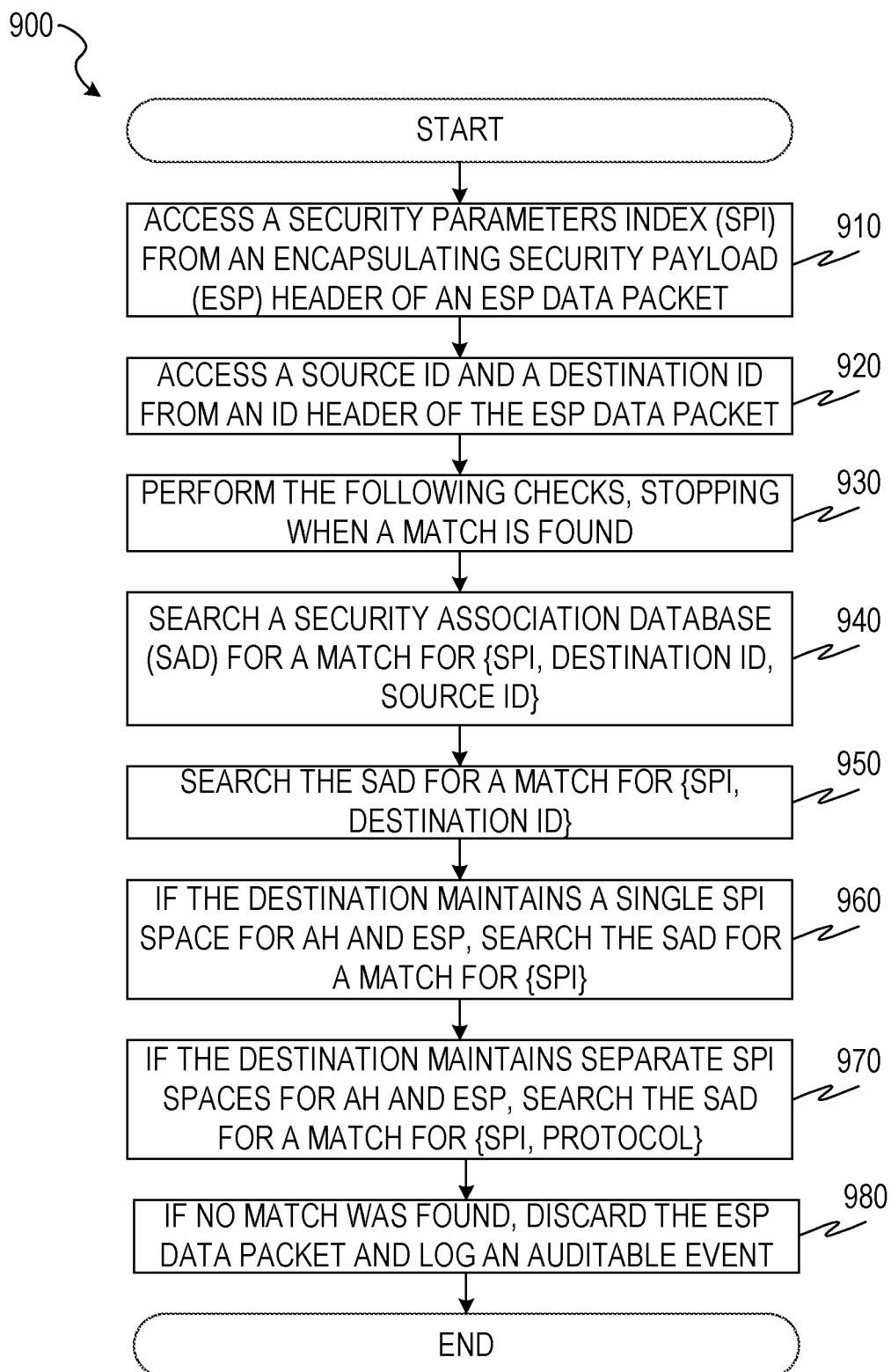
FIG. 9 is a flowchart illustration of a method of implementing ID-based data plane security in an ION, according to some example embodiments.

FIG. 9 is a flowchart illustration of a method 900 of implementing ID-based data plane security in an ION, according to some example embodiments. The method 900 includes operations 910, 920, 930, 940, 950, 960, 970, and 980. By way of example and not limitation, the method 900 is described as being performed by elements of the endpoint 120, described above with respect to FIGS. 1 and 4, and the computer 500, described above with respect to FIG. 5.

In operation 910, the authentication module 570 accesses a security parameters index (SPI) from an ESP header of an ESP data packet. For example, the endpoint 120 may receive a data packet of the form of the data structure 350 or the data structure 390, each of which includes ESP header 360. The AH 310 may include a SPI. As described in IETF RFC 4302, the SPI may be a 32-bit value used by a receiver to identify the security association to which an incoming packet is bound.

In operation 920, the authentication module 570 accesses a source ID and a destination ID from an ID header of the ESP data packet. For example, the ID header 210 is a component of both the data structure 350 and the data structure 390, and may include a source ID and a destination ID.

In operation 930, the authentication module 570 performs one or more of the checks of operations 940-970, stopping when a match is found.

In operation 940, the authentication module 570 searches a SAD for a match for {SPI, destination ID, source ID}. If an entry in the SAD has the same SPI, destination ID, and source ID as the received ESP data packet, the matching entry identifies the security association to which the packet is bound.

In operation 950, the authentication module 570 searches a SAD for a match for {SPI, destination ID}. If an entry in the SAD has the same SPI and destination ID as the received ESP data packet, the matching entry identifies the security association to which the packet is bound.

In operation 960, if the authentication module 570 maintains a single SPI space for both AH and ESP, the authentication module searches a SAD for a match for {SPI}. If an entry in the SAD has the same SPI as the received ESP data packet, the matching entry identifies the security association to which the packet is bound.

In operation 970, if the authentication module 570 maintains separate SPI spaces for AH and ESP, the authentication module searches a SAD for a match for {SPI, protocol}, where the protocol is ESP. If an entry in the SAD has the same SPI and protocol as the received ESP data packet, the matching entry identifies the security association to which the packet is bound.

In operation 980, if no match was found in operations 940-970, the received ESP data packet is discarded by the authentication module 570 and an auditable event is logged. An administrator may be notified of the auditable event. For example, the authentication module 570 may cause an email to be sent to an administrator email address. The notification may include a date/time of the event, the source ID, the destination ID, the protocol, or any suitable combination thereof.

Devices and methods disclosed herein may reduce time, processor cycles, and power consumed in implementing ID-based data plane security for IONs. For example, devices and methods disclosed herein may enable secure communication in an ION without encrypting the identifier of a destination endpoint, allowing for more rapid recovery in the event that the destination endpoint changes its location on the network. By reducing the number of packets sent to the wrong location, processor cycles and power consumption on both the source endpoint and intermediate routing devices are saved. Additionally, by not encrypting the ID header, intermediate nodes in the data path can apply various services to the transmitted packet, such as firewalling, distributed denial of service (DDoS) protection, load balancing base on the identifiers in the ID header. By contrast, existing IPSec solutions are either unencrypted or encrypt the ID header, and thus do not allow the privacy of encryption in combination with ID-oriented features.

Although a few embodiments have been described in detail above, other modifications are possible. For example, the logic flows depicted in the figures do not require the particular order shown, or sequential order, to achieve desirable results. Other steps may be provided in, or steps may be eliminated from, the described flows, and other components may be added to, or removed from, the described systems. Other embodiments may be within the scope of the following claims.

What is claimed is:

1. A computer-implemented method of transmitting encrypted data, comprising:
    accessing, by one or more hardware processors of an origination endpoint, first data to be transmitted to a destination having a corresponding destination identifier;
    generating, by the one or more hardware processors, an identifier security header, the generating of the identifier security header comprising generating an initialization vector;
    generating, by the one or more hardware processors, second data from the first data and the identifier security header;
    encrypting, by the one or more hardware processors, the second data;
    generating, by the one or more hardware processors, authentication data based on the encrypted second data;
    generating, by the one or more hardware processors, third data from the encrypted second data and the authentication data;
    generating, by the one or more hardware processors, fourth data from the destination identifier and the third data; and
    sending, by the one or more hardware processors, the fourth data to the destination.

2. The computer-implemented method of claim 1, wherein:
    the method further comprises:
        generating an Internet protocol (IP) header that is addressed to a location of the destination; and
        generating fifth data from the fourth data and the IP header; and
    the sending of the fourth data to the destination is part of sending the fifth data to the destination.

3. The computer-implemented method of claim 1, wherein:
the generating of the second data from the first data and the identifier security header prepends the identifier security header to the first data.

4. The computer-implemented method of claim 1, further comprising:
generating fifth data from the fourth data and an identifier security protocol version number; and
the sending of the fourth data to the destination is part of sending the fifth data to the destination.

5. The computer-implemented method of claim 1, further comprising:
registering, with a mapping server, one or more encryption methods supported by the origination endpoint.

6. The computer-implemented method of claim 5, further comprising:
receiving, from the mapping server, an identifier of an encryption method to use for communication with the destination, the received identifier corresponding to one of the registered encryption methods.

7. The computer-implemented method of claim 6, wherein:
the encrypting of the third data comprises encrypting the third data using the identified encryption method.

8. An origination endpoint comprising:
a memory storage comprising instructions; and
one or more hardware processors in communication with the memory storage, wherein the one or more hardware processors execute the instructions to perform:
accessing first data to be transmitted to a destination having a corresponding destination identifier;
generating an identifier security header, the generating of the identifier security header comprising generating an initialization vector;
generating second data from the first data and the identifier security header;
encrypting the second data;
generating authentication data based on the encrypted second data;
generating third data from the encrypted second data and the authentication data;
generating fourth data from the destination identifier and the third data; and
sending the fourth data to the destination.

9. The origination endpoint of claim 8, wherein:
the one or more processors further perform:
generating an Internet protocol (IP) header that is addressed to a location of the destination; and
generating fifth data from the fourth data and the IP header; and
the sending of the fourth data to the destination is part of sending the fifth data to the destination.

10. The origination endpoint of claim 8, wherein:
the generating of the second data from the first data and the identifier security header prepends the identifier security header to the first data.

11. The origination endpoint of claim 8, wherein:
the one or more processors further perform:
generating fifth data from the fourth data and an identifier security protocol version number; and
the sending of the fourth data to the destination is part of sending the fifth data to the destination.

12. The origination endpoint of claim 8, wherein the one or more processors further perform:
registering, with a mapping server, one or more encryption methods supported by the origination endpoint.

13. The origination endpoint of claim 12, wherein the one or more processors further perform:
receiving, from the mapping server, an identifier of an encryption method to use for communication with the destination, the received identifier corresponding to one of the registered encryption methods.

14. The origination endpoint of claim 13, wherein:
the encrypting of the second data comprises encrypting the second data using the identified encryption method.

15. A non-transitory computer-readable medium storing computer instructions for transmitting encrypted data, that when executed by one or more hardware processors, cause the one or more hardware processors to perform steps of:
accessing first data to be transmitted to a destination having a corresponding destination identifier;
generating an identifier security header, the generating of the identifier security header comprising generating an initialization vector;
generating second data from the first data and the identifier security header;
encrypting the second data;
generating authentication data based on the encrypted second data;
generating third data from the encrypted second data and the authentication data;
generating fourth data from the destination identifier and the third data; and
sending the fourth data to the destination.

16. The non-transitory computer-readable medium of claim 15, wherein:
the one or more processors further perform:
generating an Internet protocol (IP) header that is addressed to a location of the destination; and
generating fifth data from the fourth data and the IP header; and
the sending of the fourth data to the destination is part of sending the fifth data to the destination.

17. The non-transitory computer-readable medium of claim 15, wherein:
the generating of the second data from the first data and the identifier security header prepends the identifier security header to the first data.

18. The non-transitory computer-readable medium of claim 15, wherein the one or more processors further perform:
generating fifth data from the fourth data and an identifier security protocol version number; and
the sending of the fourth data to the destination is part of sending the fifth data to the destination.

19. The non-transitory computer-readable medium of claim 15, wherein the one or more processors further perform:
registering, with a mapping server, one or more encryption methods.

20. The non-transitory computer-readable medium of claim 19, wherein the one or more processors further perform:
receiving, from the mapping server, an identifier of an encryption method to use for communication with the destination, the received identifier corresponding to one of the registered encryption methods.

* * * * *